(12) United States Patent
Liang et al.

(10) Patent No.: US 8,542,838 B2
(45) Date of Patent: Sep. 24, 2013

(54) METHOD AND SYSTEM FOR GENERATING AND DISTRIBUTING MOBILE IP KEY

(75) Inventors: Wenliang Liang, Shenzhen (CN); Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 781 days.

(21) Appl. No.: 12/350,593

(22) Filed: Jan. 8, 2009

(65) Prior Publication Data
US 2009/0116651 A1   May 7, 2009

Related U.S. Application Data

(63) Continuation of application No. PCT/CN2007/070287, filed on Jul. 12, 2007.

(30) Foreign Application Priority Data

Jul. 12, 2006  (CN) .......................... 2006 1 0106511
Jul. 14, 2006  (CN) .......................... 2006 1 0094719
Feb. 15, 2007  (CN) .......................... 2007 1 0079181

(51) Int. Cl.
*H04L 9/00*  (2006.01)

(52) U.S. Cl.
USPC ........................................................ 380/278

(58) Field of Classification Search
USPC ........................................................ 380/278
See application file for complete search history.

(56) References Cited

U.S. PATENT DOCUMENTS 7,626,963 B2 * 12/2009 Patel et al. ..................... 370/331
7,881,262 B2 *  2/2011 Shousterman ................ 370/331
2003/0028763 A1 *  2/2003 Malinen et al. ............... 713/155
2003/0147537 A1   8/2003 Jing et al.
2003/0235305 A1 * 12/2003 Hsu .............................. 380/247

(Continued)

FOREIGN PATENT DOCUMENTS

CN      1714560 A      12/2005
WO   2005/101793 A1   10/2005

OTHER PUBLICATIONS

Written Opinion of the International Searching Authority in corresponding PCT Application No. PCT/CN2007/070287 (Oct. 25, 2007).

(Continued)

*Primary Examiner* — Kambiz Zand
*Assistant Examiner* — Abiy Getachew
(74) *Attorney, Agent, or Firm* — Leydig, Voit & Mayer, Ltd.

(57) ABSTRACT

A method and system for generating and distributing a mobile IP key are provided. The method mainly includes the following steps. During the course of access validation or re-authorization and re-authentication, a sub-key between a mobile node (MN) and an authentication, authorization, and accounting (AAA) server is computed, and an authentication extension (AE) between the MN and the AAA server is computed according to the sub-key. The AE is carried in a mobile IP registration request or a binding update (BU) request initiated by the MN, a home agent (HA) requests the key from the AAA server according to the AE in the registration request or the BU request, and the AAA server distributes the key to the HA. By using the present invention, a PMIP-client can compute the AE between the MN and the AAA server (MN-AAA-AE) without the need of distributing the key between the MN and the AAA server.

6 Claims, 11 Drawing Sheets

(56) References Cited

U.S. PATENT DOCUMENTS

| | | | |
|---|---|---|---|
| 2004/0153525 A1* | 8/2004 | Borella | 709/217 |
| 2004/0179688 A1* | 9/2004 | Lee | 380/270 |
| 2005/0025091 A1 | 2/2005 | Patel et al. | |
| 2005/0232429 A1 | 10/2005 | Chowdhury et al. | |
| 2008/0178269 A1* | 7/2008 | Kim et al. | 726/4 |
| 2009/0185691 A1* | 7/2009 | Falk et al. | 380/279 |

OTHER PUBLICATIONS

International Searching Authority in corresponding PCT Application No. PCT/CN2007/070287 (Oct. 25, 2007).

"WiMAX Forum Network Architecture (Stage 3: Detailed Protocols and Procedures)," Release 1.1.1, Sep. 12, 2007, WiMAX Forum Proprietary, Beaverton, Oregon.

* cited by examiner

METHOD AND SYSTEM FOR GENERATING AND DISTRIBUTING MOBILE IP KEY

CROSS-REFERENCE TO RELATED APPLICATIONS

This application is a continuation of International Patent Application No. PCT/CN2007/070287, filed on Jul. 12, 2007, which claims priority to Chinese Patent Application No. 200610106511.7, filed Jul. 12, 2006, Chinese Patent Application No. 200610094719.1, filed Jul. 14, 2006 and Chinese Patent Application No. 200710079181.1, filed Feb. 15, 2007, all of which are hereby incorporated by reference in their entirety.

FIELD OF THE INVENTION

The present invention relates to the network security field, in particular, to a method and system for generating and distributing a mobile IP key.

BACKGROUND

With the rapid development of Internet services and wide application of wireless networks, increasing demands on the wireless system are proposed to ensure the security of the mobile subscriber. The demands mainly include: equipment authentication, subscriber authentication, and service authorization, security channel establishment and confidential information exchange between a wireless subscriber and an access point (AP) or a base station (BS), and confidential channel establishment and confidential information exchange between the BS and an authenticator and between the authenticator and an authentication server. The above demands are not required to be considered in a private network.

FIG. 1 shows a conventional centralized worldwide interoperability microwave access (WiMAX) security network architecture system. In the architecture, the authenticator and the BS are located in different physical entities, functions of the authenticator and a key distributor are realized in the authenticator, and functions of an authentication relay and a key receiver are realized in the BS.

FIG. 2 shows a conventional distributed WiMAX security network architecture system. In the architecture, the authenticator and the BS are located in the same physical entity, and the entity realizes the functions of the authenticator, the authentication relay, the key distributor, and the key receiver at the same time.

The functions of each network element (including logic network elements) in the centralized and the distributed WiMAX security network architecture system are described as follows.

The BS provides a security channel between a terminal MS and the BS, including compression and encryption of air interface data, and provides confidential information exchange with the MS.

The authenticator provides an agent function for MS authentication, authorization, and accounting functions, and is realized in the same physical entity with the key distributor.

The authenticator relay realizes the relay of an authentication request and a response message during an authentication course.

The key distributor is realized in the same physical entity with the authenticator, and adapted to generate an air interface key AK shared between the BS and the MS according to root key information equivalent to the MS provided by the authentication server and distribute the AK to the key receiver.

The key receiver is realized in the BS, and adapted to receive the AK generated by the key distributor and derive other keys between the BS and the MS.

In addition, a complete security network architecture system also includes a back-end network authentication server and a mobile terminal MS.

The authentication, authorization, and accounting (AAA) server mainly realizes the MS authentication, authorization, and accounting functions, and exchanges information required by the generation of the key with the MS through a key generation mechanism set there-between. The information is exchanged before the security channel is built, so a key algorithm adopted between the authentication server and the MS must ensure that the information leak does not affect the security mechanism. The main functions of the server include: realizing the MS authentication, authorization, and accounting functions; generating and distributing the root key information to the authenticator; and when the subscriber information is changed, notifying the authenticator and other network elements of the result of the information change in time.

The MS is a mobile subscriber equipment, and mainly adapted to initiate the authentication and authorization in the security architecture, exchange information required by the generation of the root key with the authentication server, generate the root key, and generate the AK and information about other derived keys required by the confidentiality on the air interface according to the root key.

A mobile Internet protocol (MIP) system mainly includes the following functional entities: a mobile node (MN), a foreign agent (FA), and a home agent (HA). The MN initiates a mobile IP (MIP) registration request to the HA through the FA. On receiving the MIP registration request, the HA maps a care of address (CoA) of the MN to a home address (HoA) of the MN, and since then, all the data packets received by the HA having a destination address being the HoA of the MN are forwarded to the CoA address of the MN, i.e., the address of the FA in MIPv4. In order to ensure the security, the MIP message usually carries an authentication extension (AE), for example, the AE between the MN and the HA (MN-HA-AE). When receiving an MIP registration request carrying the MN-HA-AE, the HA computes a local authentication value according to the already-known key information, and then compares the local authentication value with the MN-HA-AE carried in the data packet. If the comparison result shows that the local authentication value is the same as the MN-HA-AE, the authentication is passed and the MIP registration request is processed; otherwise, the MIP registration request is rejected.

When the pre-obtained key information does not exist between the MN and the HA, the MN performs the authentication on the MIP registration request by using the key information between the MN and the AAA server.

In the conventional WiMAX technique, the MIP registration key is generally computed according to the IP address of the HA and/or the FA in the following formulae:

MN-HA-K:H(MIP-RK,"MIP4 MN HA",HA-IP);

MN-FA-K:H(MIP-RK,"MN FA",FA-IP);

FA-HA-K:H(MIP-RK,"FAN HA",FA-IP,HA-IP, nonce).

In a request for comments (RFC) 3957, the following algorithm is specified, in which the MIP registration key is computed by using a random number, an MN identifier (MN-ID), and a shared key between the MN and the AAA server.

key=HMAC-SHA1(AAA-key,{Nonce||MN-ID})

The MIP has two forms in the WiMAX: a client MIP (CMIP) and a proxy MIP (PMIP). For a terminal supporting the MIP protocol (as shown in 3a), the MN is the mobile terminal MS when operating in the CMIP mode. On the contrary, for a terminal not supporting the MIP protocol (as shown in FIG. 3b), a PMIP-client entity is created on a network side for realizing the function of the MIP as the MN.

In the conventional WiMAX system, a method for generating and distributing the key includes the following two types.

1. The Generation and Distribution of a PMIPv4 Key

During an access validation course, the AAA generates an extended master session key (EMSK), then computes a root key of the MIP (MIP-RK), and derives the keys between the MN and the HA, the MN and the FA, and the FA and the HA. Then, according to the method described in Section 3.5 of RFC2868, the key between the MN and the HA, optionally between the MN and the FA and between the FA and the HA, is encrypted and transmitted to a network attached storage (NAS). According to the key between the MN and the HA, the PMIP-client directly computes the MN-HA-AE and sends a mobile IP registration request. On receiving the registration request, the HA determines whether it is necessary to request the AAA server for the MIP key.

2. The Generation and Distribution of a CMIPv4 Key

During the access validation course, the AAA server generates the EMSK, then computes the MIP-RK, and derives the keys between the MN and the HA, the MN and the FA, and the FA and the HA. If the MN initially does not know the address of the HA, it is impossible for the MN to compute the key between the MN and the HA, and even if all 0/1 are used, it is still necessary to update or notify the AAA server after obtaining the real HA-IP. An HA related key is obtained from the AAA server during the first MIP registration request.

During the process of realizing the present invention, the inventors found that the method for generating and distributing the key in the prior art has at least the following problems.

1. The PMIP-client cannot compute the AE between the MN and the AAA server (MN-AAA-AE), and if the computation is required, the shared key between the MN and the AAA server (MN-AAA-K) must be distributed. The MN-AAA-K is not suitable to be distributed.

2. In the case of the re-validation and FA migration, the manner of knowing the key update by the HA is not unified (for example, the key update may be known in the following manners: when the HA cannot perform the validation on the AE, when the registration request carries the MN-AAA-AE, when a security parameter index (SPI) is changed, or according to the MIP registration request content HA-IP), and the existing RFC is not used.

3. When the HA is not distributed by the AAA server, the AAA server needs to obtain the IP address of the HA practically adapted to compute the key between the MN and the HA.

4. During the computation of the key according to the IP address, it is necessary to distinguish the IP addresses of different terminals, which is very complicated.

5. If the MN initially does not know the address of the HA, it is impossible for the MN to compute the key between the MN and the HA, and even if all 0/1 are used, it is still necessary to update or notify the AAA server after obtaining the real HA-IP.

SUMMARY

Accordingly, the present invention provides a method and system for generating and distributing a mobile IP (MIP) key, in which a proxy MIP (PMIP) client computes an AE between the MN and the AAA server (MN-AAA-AE) without the need of distributing a key between a mobile node (MN) and an authentication, authorization, and accounting (AAA) server.

The objective of the present invention is achieved by the following technical solutions.

A method for generating and distributing an MIP key includes a computing procedure and a key distributing procedure.

In the computing procedure, a sub-key between an MN and an AAA server is computed, and an AE between the MN and the AAA server is computed according to the sub-key during the course of access validation or re-authorization and re-authentication.

In the key distributing procedure, the AE is carried in an MIP registration request or a binding update (BU) request initiated by the MN, an HA requests the MIP key from the AAA server according to the AE in the registration request or the BU request, and the AAA server distributes the MIP key to the HA.

A system for generating and distributing an MIP key includes an equipment adapted to compute a sub-key between an MN and an AAA server during the course of access validation or re-authorization and re-authentication; an equipment adapted to compute an AE between the MN and the AAA server according to the sub-key; an MN adapted to initiate an MIP registration request or a BU request carrying the AE between the MN and the AAA server computed according to the sub-key; and an HA adapted to request the key from the AAA server according to the AE in the registration request or the BU request.

A method for generating and distributing an MIP key includes the following steps.

An MN sends an MIP registration request carrying a first AE between the MN and an HA, and the first AE is generated according to a first key between the MN and the HA computed by using an IP address replacement value.

The HA receives the MIP registration request, obtains the first key from the authentication server and a second key between the MN and the HA computed by using an IP address of the HA.

The HA validates the first AE in the registration request by using the first key, and transmits an MIP registration report to an FA after the successful validation. The registration report carries a second AE generated according to the second key.

The FA transmits the registration report carrying the second AE to the MN, and the MN validates the second AE by using the second key.

A system for generating and distributing an MIP key includes an MN, an HA, and an FA.

The MN is adapted to transmit an MIP registration request. The MIP registration request carries a first AE generated according to a first key between the MN and an HA computed by using an IP address replacement value.

The HA is adapted to receive the MIP registration request, obtain the first key from the authentication server and a second key between the MN and the HA computed by using an IP address of the HA, and transmit an MIP registration report carrying a second AE computed according to the second key to an FA after a successful validation of the first AE in the registration request by using the first key.

The FA is adapted to receive and transmit the registration request to the HA, so that the HA processes the registration request and transmits the registration report carrying the second AE to the MN.

The MN validates the second AE by using the second key.

A method for generating and distributing an MIP key includes the following steps.

A PMIP-client sends an MIP registration request to an FA, and an AE is carried in the MIP registration request. The AE is generated according to a key between an MN and an HA computed by using an IP address of the HA.

The HA receives the MIP registration request transmitted by the FA, obtains the key between the MN and the HA computed by using the IP address of the HA from the authentication server.

The HA validates the AE in the registration request by using the key between the MN and the HA, and transmits an MIP registration report to the FA after the successful validation. The registration report carries the AE generated by the key between the MN and the HA.

The FA transmits the registration report carrying the AE to the PMIP-client.

A system for generating and distributing an MIP key includes a PMIP-client, an HA, and an FA.

The PMIP-client is adapted to transmit an MIP registration request to the FA, and carry an AE generated according to a key between an MN and the HA computed by using an IP address of the HA.

The HA is adapted to receive the MIP registration request, request the key between the MN and the HA computed by using the IP address of the HA from the authentication server, and transmit an MIP registration report carrying the AE computed according to the key to the FA after a successful validation of the AE in the registration request by using the key.

The FA is adapted to receive and transmit the MIP registration request from the PMIP-client to the HA, receive the MIP registration report from the HA, and transmit the registration report carrying the AE to the PMIP-client.

Seen from the technical solutions of the present invention, the PMIP-client computes the AE between the MN and the AAA server (MN-AAA-AE) without the need of distributing the key between the MN and the AAA server (MN-AAA-K).

In the embodiment of the present invention, the MIP registration process of a network working group (NWG) is realized by reasonably utilizing the existing RFC course, so as to reduce the computing complexity by using the IP address as a parameter for computing the MIP key.

DETAILED DESCRIPTION

Figure 1:
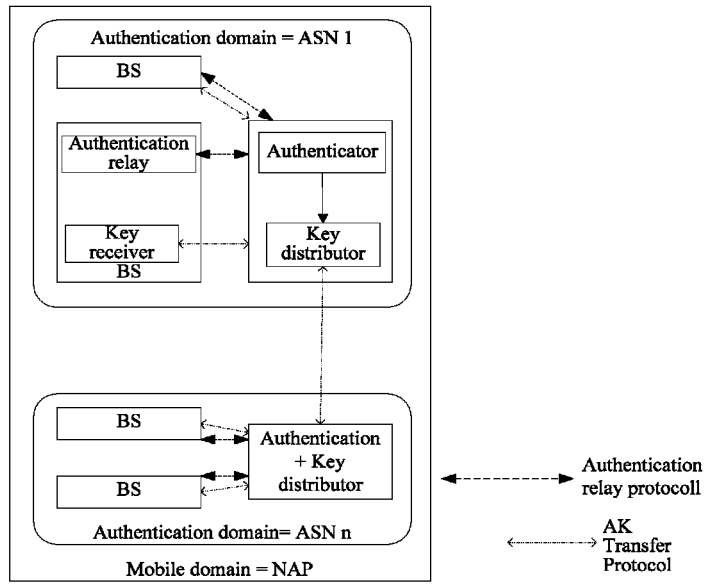
FIG. 1 shows a centralized WiMAX security network architecture system.
Figure 2:
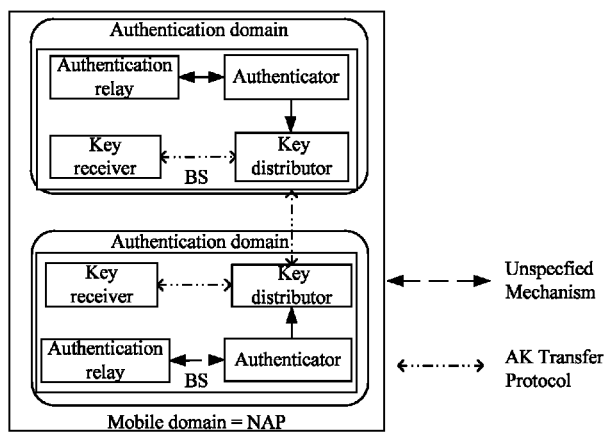
FIG. 2 shows a distributed WiMAX security network architecture system.
Figure 3A:
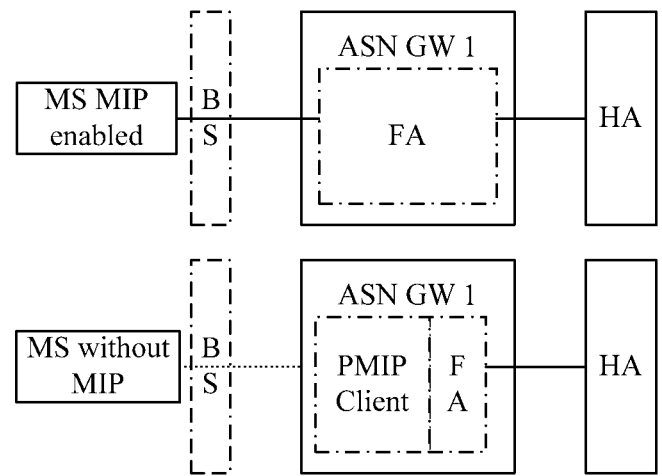
FIG. 3a shows a complete security network architecture system based on a CMIP.
Figure 3B:
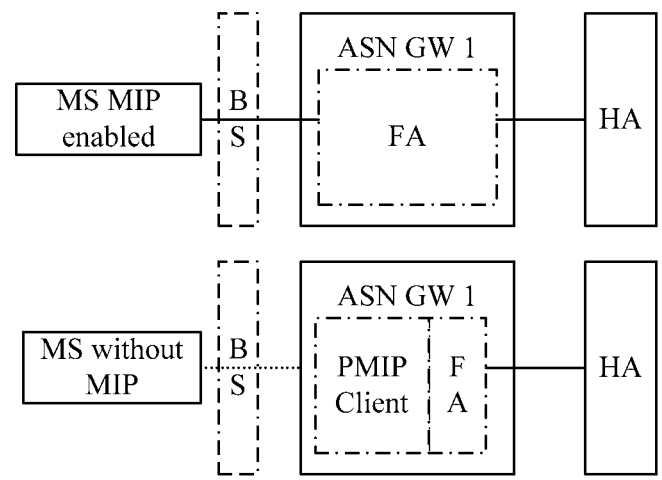
FIG. 3b shows a complete security network architecture system based on a PMIP.

In order to have a further understanding of the objectives, technical solutions, and advantages of the embodiment of the present invention, a detailed description is given below by embodiments with the accompanying drawings.

The WiMAX security network architecture system is taken as an example to describe the embodiment of the present invention, but the technical solutions provided by the invention include, but not limited to, the application in the WiMAX system.

In the embodiment of the embodiment of the present invention, a sub-key, exclusively adapted to generate an AE between an MN and an AAA server (MN-AAA-AE), is adapted to compute the MN-AAA-AE in a PMIP and a CMIP mode; therefore, the PMIP-client may compute the AE between the MN and the AAA server (MN-AAA-AE) without the need of distributing the key between the MN and the AAA server (MN-AAA-K); the distribution of the key between the MN and the AAA server is prevented, and the PMIP and the CMIP are unified to inform the HA during the re-validation and FA migration. In the embodiment of the present invention, the sub-key is a key (here referred to as MN-AAA-SUB-K) derived from the key shared between the MN and the AAA server (MN-AAA-K) or a pre-configured key, and the embodiment of the present invention is not limited thereto.

For the computation of the MN-AAA-SUB-K key, so long as the MN and the AAA in the CMIP mode adopt the same computing method, it is ensured that the MN-AAA-SUB-K derived from the same MN-AAA-K is the same, thus achieving the objective of the embodiment of the present invention. In addition, it is further required that the MN-AAA-K cannot be computed according to the known MN-AAA-SUB-K entity, which is already mature in the field.

When the MN-AAA-SUB-K is generated, a corresponding lifetime may be distributed, and when the lifetime is expired, the re-validation is triggered. If the re-validation is triggered due to other reasons, the MN-AAA-SUB-K update is also triggered.

In addition, in the embodiment of the present invention, on the basis of the above concept, the MIP key of each MIP entity is computed by adopting a random number, so as to reduce the computing complexity by adopting the IP address as a parameter for computing the MIP key.

However, for the computation of the MIP key, in the embodiment of the present invention, the MIP key can not only be computed by adopting a random number, but also by an existing MIP key algorithm based on the IP address.

An example of the computation of the MIP key based on the random number is given below.

For the computation of the MN-FA-K and the MN-HA-K, the computing formula of the MN-FA-K and the MN-HA-K in the RFC3957 may be adopted.

In the RFC3957, the computing formula of the MN-FA-K and the MN-HA-K is:

$$Key=HMAC\text{-}SHA1(AAA\text{-}key,\{key\ Generation\ Nonce\|MN\text{-}ID\})$$

where, Key Generation Nonce represents a random number between the MN and the FA or a random number between the MN and the HA.

For the computation of the FA-HA-K, with reference to the computing formula of the MN-FA-K and the MN-HA-K in the RFC3957, the random number generated and distributed by the AAA server is adopted as an input parameter, and is combined with a root key of the MIP key or key information between the MN and the AAA. Besides, an MN identifier (MN-ID) is included, and a key between the FA and the HA is calculated. For example, the FA-HA-K can be computed in the following formula:

$$key=HMAC\text{-}SHA1(AAA\text{-}key,\{key\ Generation\ Nonce\text{-}1\|key\ Generation\ Nonce\text{-}2\|MN\text{-}ID\})$$

where, AAA-key is a root key adapted to compute the MIP key, and may be the MN-AAA-SUB-K or other root keys like MSK, EMSK, or MIP-RK. Key Generation Nonce-1 and Key Generation Nonce-2 respectively represent the random number between the MN and the FA and the random number between the MN and the HA.

When only a random number is requested, the random numbers serving as the parameters may be correspondingly reduced.

Alternatively, other information shared by the FA and the HA, instead of the random number, may be used as the parameter.

The aforementioned computing formula of the MIP key is taken as an example for illustration only, and based on the concept of the embodiment of the present invention, those skilled in the art may have various alternative manners easily known and implemented. Therefore, in the embodiment of the present invention, the computation of the MIP key based on the random number is not limited to the above formula.

Embodiment 1

Generation and Distribution of a PMIPv4 Key

1. The Generation and Distribution of the PMIP Key Based on a Random Number.

Figure 4A:
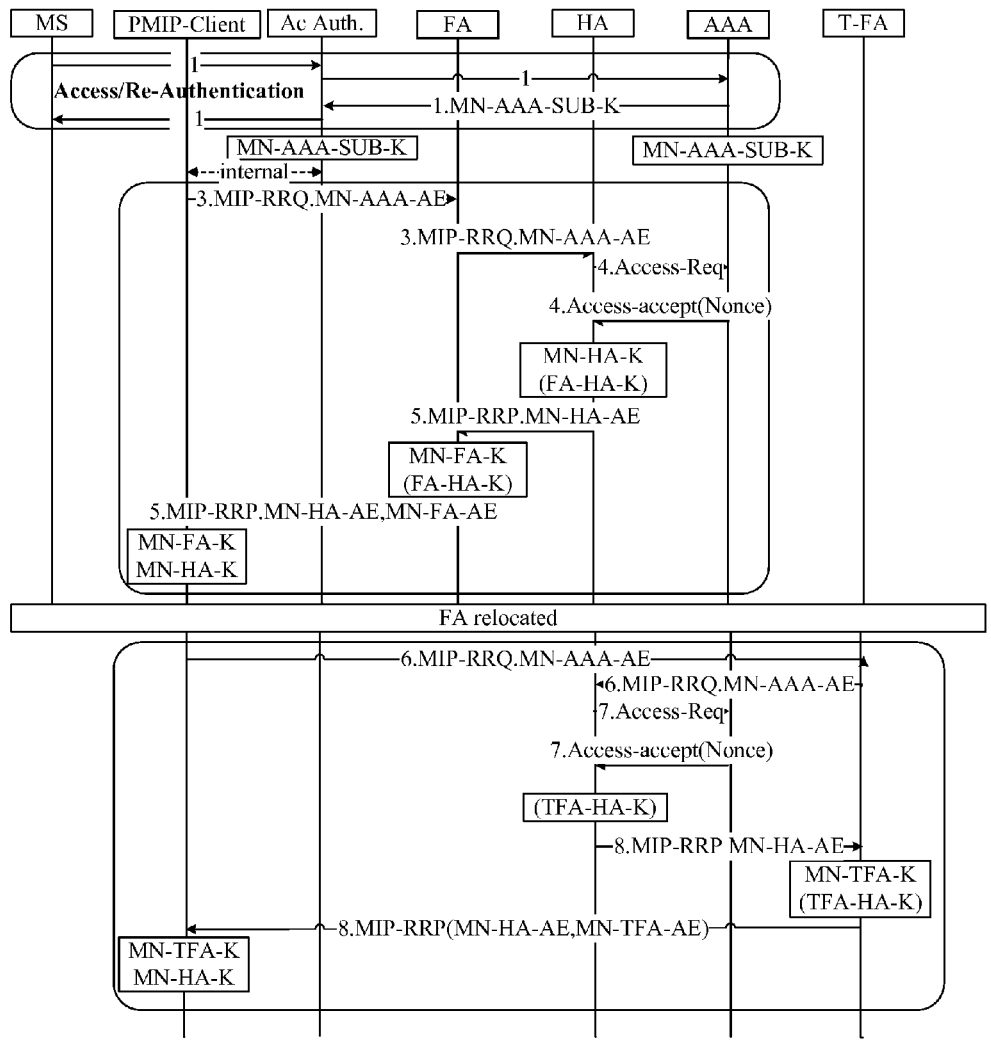
FIG. 4a shows a flow of generating and distributing a PMIPv4 key based on a random number according to a first embodiment of the present invention.

FIG. 4a shows a flow of generating and distributing an MIP key based on a random number in the PMIP mode according to this embodiment, and the flow includes the following steps.

In Step 1, during the course of access validation or re-authorization and re-authentication, the AAA server computes the MN-AAA-SUB-K according to the MN-AAA-K (or the pre-configured key), and distributes the key information including the MN-AAA-SUB-K and the root key to an anchor authenticator.

The root key may be the MN-AAA-SUB-K or other root keys like MSK, EMSK, or MIP-RK. When the root key is the MN-AAA-SUB-K, the MN-AAA-SUB-K is adapted to generate the MN-AAA-AE and also compute the MIP key. When the root key of the MIP key is any other root key, the MN-AAA-SUB-K is exclusively adapted to generate the MN-AAA-AE, and the other root key (for example, the MIP-RK) computes the MIP key.

In Step 2, the PMIP-client and the anchor authenticator share the MN-AAA-SUB-K information through internal interaction.

The PMIP-client and the anchor authenticator are located in one physical entity, so as to share the key information.

In Step 3, after obtaining the MN-AAA-SUB-K, the PMIP-client computes the MN-AAA-AE and triggers an MIP registration process according to the definition of the RFC3957. Preferably, the MIP registration process is an initial MIP registration process.

The whole MIP registration process (Steps 3 to 5 in FIG. 4a) after the MIP registration is triggered may be performed according to the RFC3957, except that the FA does not directly interact with the AAA server. In the registration process specified by the existing RFC3957, after receiving the MIP registration request, the FA directly requests the key from the AAA server, and then the AAA server computes and distributes the key random number to the FA and the HA. However, in the existing WiMAX network, the FA does not directly send the request to the AAA server, so that the FA directly forwards the MIP registration request to the HA, and the HA exchanges the key and the random number with the AAA server (referring to Step 4). In this embodiment, when the FA directly interacts with the AAA server, the whole process can be performed according to the RFC3957.

The FA and the anchor authenticator are located in one physical entity, so as to share the MIP key information obtained by the anchor authenticator through internal interaction.

In Step 4, on receiving the MIP registration request, the HA determines whether to request the key from the AAA server or not according to the fact whether the AE between the MN and the AAA (MN-AAA-AE) is carried or not. If the MIP registration request carries the MN-AAA-AE, the HA requests an HA related MIP key (the MN-HA-K or FA-HA-K) and a random number required by the generation of the MIP key (the random number between the MN and the HA, and the random number between the MN and the FA) from an HAAA server. If the HA is located in a visitor network, the request message is forwarded by a visitor AAA (VAAA) server. The AAA server performs the validation by using the MN-AAA-SUB-K, and after the successful validation, the AAA server distributes the MN-HA-K, the FA-HA-K (if necessary), and the random number to the HA.

In Step 5, the HA processes the MIP registration request. If the registration is successful, the HA returns an MIP registration report (MIP-RRP) to the FA, and the message carries the AE (the MN-HA-AE or FA-HA-AE) and the random number.

According to the MIP root key information distributed by the AAA server and the random number distributed during the MIP registration process, the anchor authenticator computes the MIP key between the FA and the MN (MN-FA-K) and the MIP key between the FA and the HA (FA-HA-K). The FA obtains the MN-FA-K and the FA-HA-K from the anchor authenticator through internal interaction, and validates the MIP-RRP. After the successful validation, the MIP-RRP carrying the AE (the MN-FA-AE and the MN-HA-AE) is transmitted to the PMIP-client.

Similarly, the PMIP-client obtains the MN-HA-K and the MN-FA-K from the anchor authenticator through internal interaction, and validates the MIP-RRP from the FA.

In Step 6, if the FA migrates, the PMIP-client is triggered by the entity with the R3 migration, also performs the MIP registration process and the dynamic computing distribution of the MIP key according to the RFC3957. Different from the RFC3957, the FA does not directly interact with the AAA server but directly forwards the MIP registration request to the HA, so that the HA exchanges the key and the random number with the AAA server (the FA may be added to the interaction process, and when the FA directly interacts with the AAA server, the whole process can be performed according to the RFC3957). During the R3 migration, the root key information of the MIP key is transferred by a service access service network gateway (ASN-GW) to a target ASN-GW (if the root key is not transferred, the target ASN-GW needs to request the computation of the sub-key from the service ASN-GW through an access network internal primitive). Through the MIP registration process similar to Steps 3 to 5, the target FA (TFA) may also build a security association with the MN. However, different from the MIP registration process of Steps 3 to 5, in this process, the (MN-HA-K) is not changed, the MIP registration request does not request the random number of the MN-HA, and the MIP registration request carries the AE between the MN and the HA MN-HA-AE, so that when requesting the random number from the AAA server according to the received MIP registration request, the HA may only request the random number between the MN and the FA instead of the random number between the MN and the HA. In the case of the FA migration, a demand is proposed to the AAA server, i.e., it is necessary to save the random number generated for the MN-HA in advance.

In addition, when the FA migrates, the MIP registration process of Steps 3 to 5 may be re-executed by means of the access validation and the re-authorization and re-authentication (here, it is necessary to re-request the random number between the MN and the HA and the random number between the MN and the FA).

If in Step 6 the TFA of the R3 migration does not have the shared key with the HA, the anchor authenticator and the AAA server are also required to refresh the FA-HA-K at the same time. Moreover, the TFA requests the original root key or the FA-HA-K from the service FA and refreshes the key into TFA-HA-K, or directly requests the TFA-HA-K. A refreshing manner is provided as follows.

A new MN-TFA-K is computed by using the key shared between the HA/AAA and the original FA and the information shared between the HA/AAA and the TFA (for example, the FA-IP).

Alternatively, a new TFA-HA-K is computed by re-substituting the shared key in the computing formula as the root key. Definitely, the key refreshing manner is not limited herein.

In this embodiment, the algorithm for refreshing the key is not limited, as long as the algorithms of the two parts involved in the refreshing are consistent.

On receiving the MIP registration request carrying the MN-AAA-AE, the HA requests the TFA-HA-K from the AAA server. On receiving the request of the HA, the AAA server computes the TFA-HA-K according to the refreshing algorithm, and then distributes the TFA-HA-K to the HA. The subsequently accessed MN may register on the MIP by using the built TFA-HA-K.

2. The Generation and Distribution of the PMIPv4 Key Based on the IP Address

In this embodiment, the RFC3957 solution is applied in Steps 3 to 6, and definitely other MIP key distribution processes may also be adopted. In the embodiment of the present invention, when the MN-AAA-AE is computed, the MN-AAA-SUB-K instead of the MN-AAA-K is utilized. Another example is given below to describe an alternative generation and distribution process of the MIP key of this embodiment.

Figure 4B:
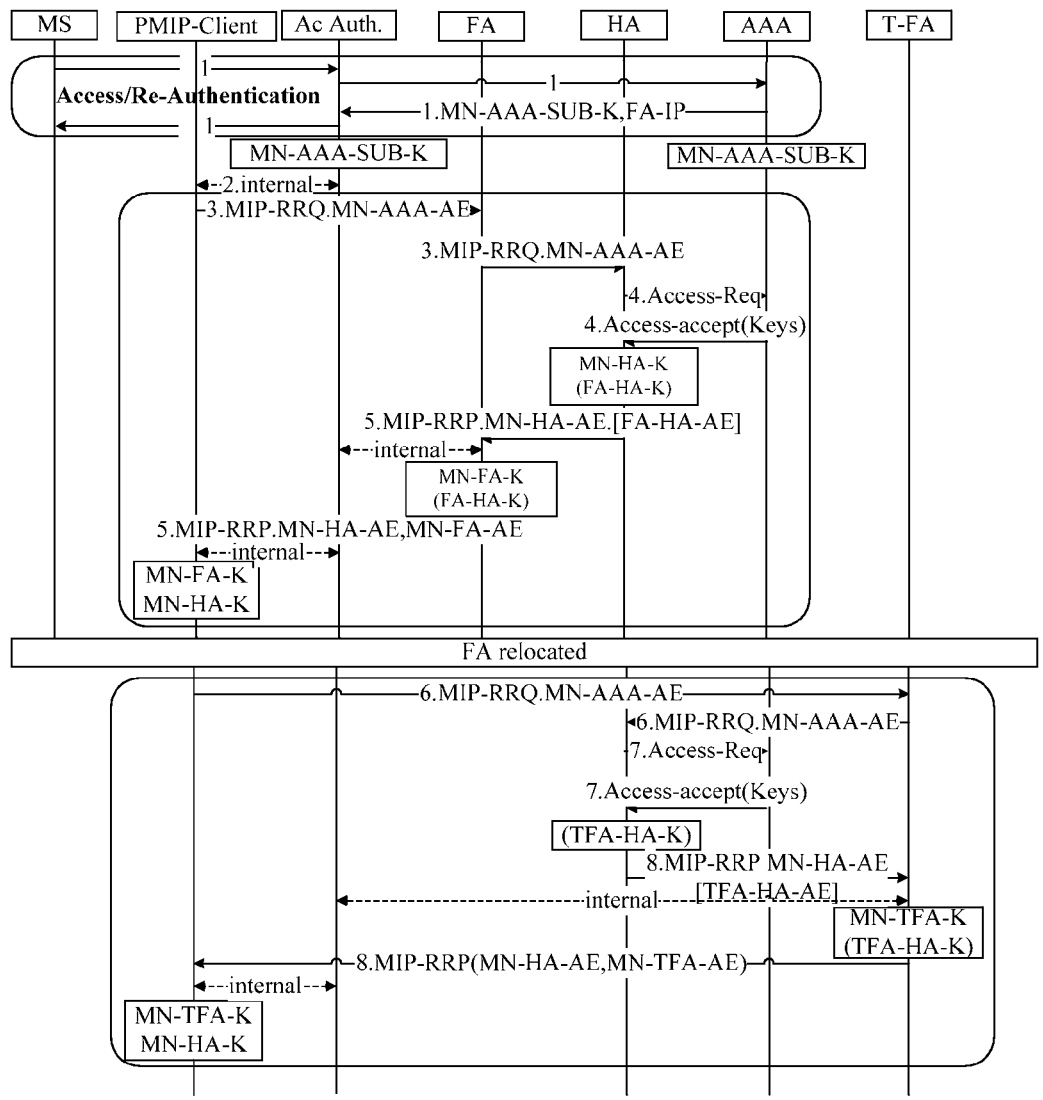
FIG. 4b shows a flow of generating and distributing the PMIPv4 key based on an IP address according to the first embodiment of the present invention.

FIG. 4b shows a flow of generating and distributing the PMIP key based on the IP address according to this embodiment, and the flow includes the following steps.

In Step 1, during the course of initial access validation or re-authorization and re-authentication, the AAA server computes the MN-AAA-SUB-K according to the MN-AAA-K or the pre-configured key, and distributes the key information including the MN-AAA-SUB-K and the root key to an anchor authenticator. The root key may be the MN-AAA-SUB-K or other root keys.

In Step 2, the PMIP-client and the anchor authenticator share the key information.

In Step 3, the PMIP-client initiates the MIP registration request process, the MIP-RRQ message carries the MN-AAA-AE computed according to the MN-AAA-SUB-K, and after receiving the MIP-RRQ message, the FA transmits the MN-AAA-AE to the HA.

In Step 4, the HA notifies the HA-IP adapted to compute the key to the AAA server, requests the validation information, and requests the keys MN-HA-K and FA-HA-K. The AAA server performs the validation by using the MN-AAA-SUB-K, and if the validation is passed, the AAA server computes and distributes the key to the HA.

In Step 5, after obtaining the requested key (the MN-HA-K or the FA-HA-K), the HA processes the MIP registration request, and if the registration is allowed, the HA transmits the MIP-RRP (carrying the MN-HA-AE or the FA-HA-AE) to the FA. The FA requests the MN-FA-K and the FA-HA-K (if necessary) from the anchor authenticator. Then, the FA validates the received MIP-RRP message. After the successful validation, the FA transmits the MIP-RRP message carrying the AE to the PMIP-client. The PMIP-client requests the keys MN-HA-K and MN-FA-K from the anchor authenticator to validate the MIP-RRP message from the FA.

In Steps 6 to 8, if the FA migrates, the PMIP-client is triggered to re-initiate the MIP registration request, and performs the MIP registration process similar to Steps 3 to 5.

Embodiment 2

Generation and Distribution of a CMIPv4 Key

1. The Generation and Distribution of the CMIPv4 Key Based on a Random Number

Figure 5A:
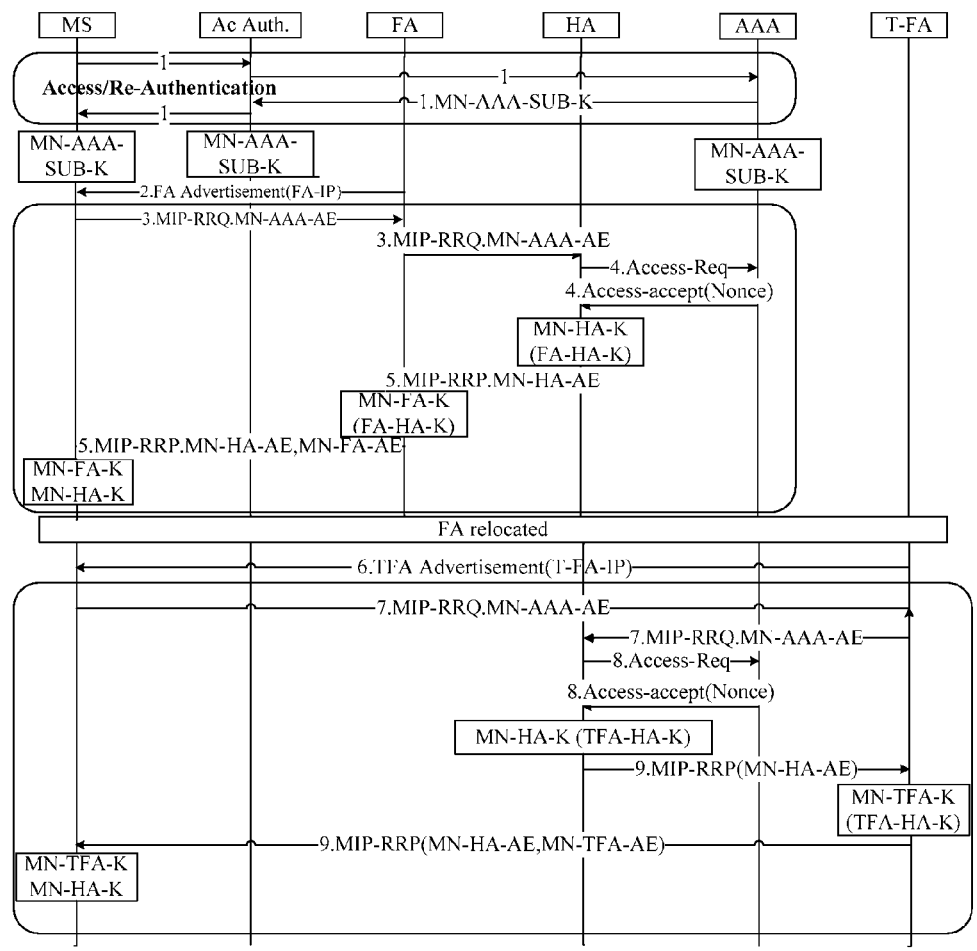
FIG. 5a shows a flow of generating and distributing a CMIPv4 key based on the random number according to a second embodiment of the present invention.

FIG. 5a shows a flow of generating and distributing an MIP key based on a random number in the CMIP mode according to this embodiment, and the flow includes the following steps.

In Step 1, the MS and the AAA server computes the MN-AAA-SUB-K according to the MN-AAA-K (or the pre-configure key). The AAA server distributes the root key including the MIP key to an anchor authenticator.

The root key may be the MN-AAA-SUB-K or other root keys like MSK, EMSK, or MIP-RK, so as to compute the MIP key.

In Step 2, the FA transmits an agent broadcast to the mobile node MS.

In Step 3, on receiving the agent broadcast transmitted by the FA, the mobile node MS computes the MN-AAA-AE by using the MN-AAA-SUB-K and triggers an MIP registration process according to the definition of the RFC3957.

The whole MIP registration process after the MIP registration is triggered may be performed according to the RFC3957, except that the FA does not directly interact with the AAA server but directly forwards the MIP registration request to the HA, so that the HA exchanges the key and the random number with the AAA server (the FA may also be added to the interaction process, and when the FA directly interacts with the AAA server, the whole process can be performed according to the RFC3957).

The FA and the anchor authenticator are located in one physical entity, so as to share the key information with the anchor authenticator through internal interaction.

In Step 4, after the HA receives the MIP registration request, if the MIP registration request carries the MN-AAA-AE, the HA requests the validation and an HA related MIP key (the MN-HA-K or the FA-HA-K) and the random number (the random number between the MN and the HA, and the random number between the MN and the FA) from an HAAA server. After the successful validation, the HAAA distributes the MN-HA-K, the FA-HA-K (if necessary), and the random number to the HA.

In Step 5, the HA processes the MIP registration request. If the registration is successful, the HA returns an MIP registration report (MIP-RRP) to the FA, and the message carries the AE (the MN-HA-AE or the FA-HA-AE) and the random number.

According to the MIP root key information distributed by the AAA server and the random number distributed during the MIP registration process, the anchor authenticator computes the MIP key between the FA and the MN (MN-FA-K), and the MIP key between the FA and the HA (FA-HA-K). The FA obtains the MN-FA-K and the FA-HA-K from the anchor authenticator through internal interaction, and validates the MIP-RRP. After the successful validation, the MIP-RRP carrying the AE is transmitted to the mobile terminal MS (i.e., the CMIP-client).

Similarly, the mobile terminal MS (i.e., the CMIP-client) computes the MN-HA-K and the MN-FA-K according to the obtained random number and the root key, and validates the MIP-RRP from the FA.

In Steps 6 to 9, if the FA migrates, after the MS receives an agent broadcast message from the TFA, the MIP registration process and the dynamic computing distribution of the MIP key are performed according to the RFC3957. Different from the RFC3957, the FA does not directly interact with the AAA server but directly forwards the MIP registration request to the HA, so that the HA exchanges the key and the random number with the AAA server (the FA may be added to the interaction process, and when the FA directly interacts with the AAA server, the whole process can be performed according to the RFC3957). During the R3 migration, the root key information of the MIP key is transferred by a service ASN-GW to a target ASN-GW (if the root key is not transferred, the target ASN-GW needs to request the computation of the sub-key from the service ASN-GW through an access network internal primitive). Through the MIP registration process similar to Steps 3 to 5, the TFA may also build a security association with the MN. However, different from the MIP registration process of Steps 3 to 5, in this process, the MN-HA-K is not changed, the MIP registration request does not request the random number of the MN-HA, and the MIP registration request carries the AE between the MN and the HA MN-HA-AE, so that when requesting the random number from the AAA server according to the received MIP registration request, the HA may only request the random number between the MN and the FA instead of the random number between the MN and the HA. In the case of the FA migration, a demand is proposed to the AAA server, i.e., it is necessary to save the random number generated for the MN-HA in advance.

In addition, when the FA migrates, the MIP registration process of Steps 3 to 5 may be re-executed by means of the access validation and the re-authorization and re-authentication (here, it is necessary to re-request the random number between the MN and the HA and the random number between the MN and the FA).

If the TFA of the R3 migration of Step 6 does not have the shared key with the HA, the anchor authenticator and the AAA server are also required to refresh the FA-HA-K at the same time. A refreshing manner is provided as follows.

A new MN-TFA-K is computed by using the key shared between the HA/AAA and the original FA and the information shared between the HA/AAA and the TFA (for example, the FA-IP).

Alternatively, a new TFA-HA-K is computed by re-substituting the shared key in the computing formula as the root key. Definitely, the key refreshing manner is not limited herein.

On receiving the MIP registration request carrying the MN-AAA-AE, the HA requests the TFA-HA-K from the AAA server. On receiving the request of the HA, the AAA server computes the TFA-HA-K according to the refreshing algorithm, and then distributes the TFA-HA-K to the HA. The subsequently accessed MN may register on the MIP by using the built TFA-HA-K.

2. The Generation and Distribution of the CMIPv4 Key Based on the IP Address

In this embodiment, the RFC3957 solution is applied in Steps 3 to 6, and definitely other MIP key distribution processes may also be adopted. In the embodiment of the present invention, when the MN-AAA-AE is computed, the MN-AAA-SUB-K instead of the MN-AAA-K is utilized. Another example is given to describe an alternative generation and distribution process of the MIP key of this embodiment.

Figure 5B:
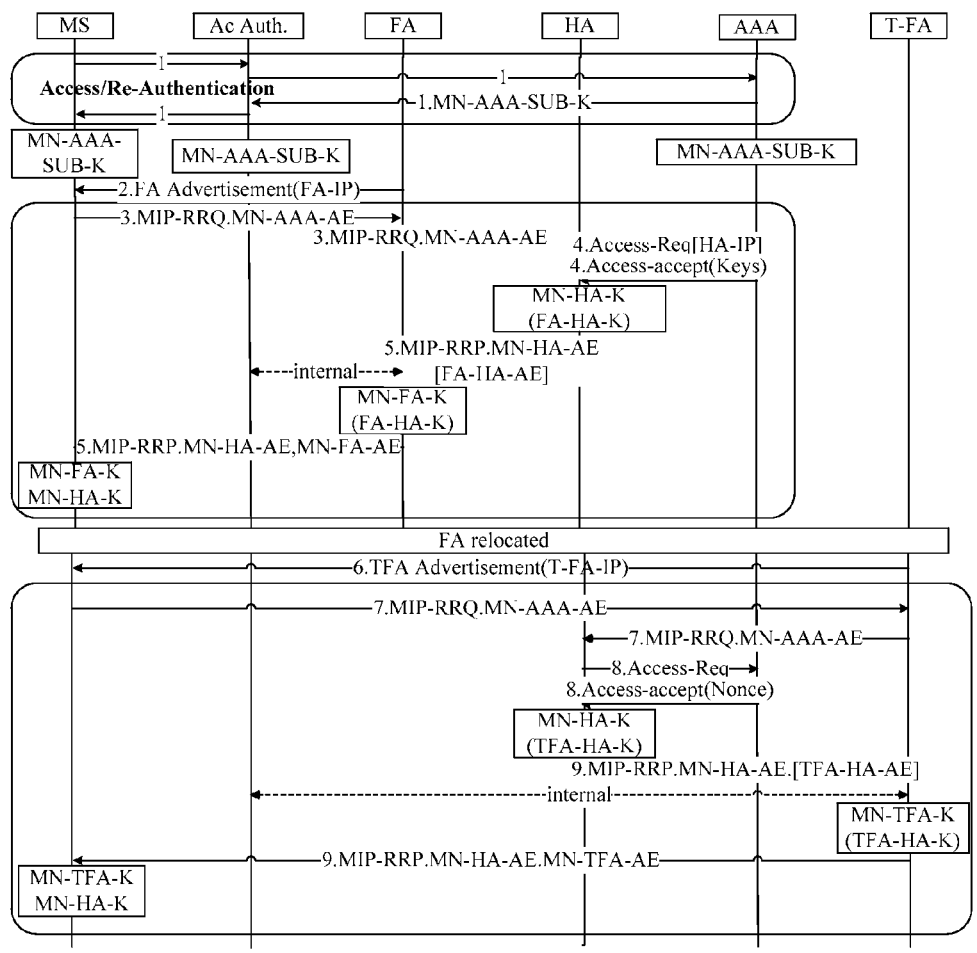
FIG. 5b shows a flow of generating and distributing the CMIPv4 key based on the IP address according to the second embodiment of the present invention.

FIG. 5b shows a flow of generating and distributing the CMIP key based on the IP address according to this embodiment, and the flow includes the following steps.

In Step 1, during the course of initial access validation or re-authorization and re-authentication, the MN and the AAA server compute the MN-AAA-SUB-K according to the MN-AAA-K or the pre-configured key, and the AAA server distributes the root key of the MIP key to an anchor authenticator.

The root key may be the MN-AAA-SUB-K or other root keys like MSK, EMSK, or MIP-RK.

In Step 2, the FA transmits a router broadcast message to the MN.

In Step 3, the MN initiates the MIP registration request process, the MIP-RRQ message carries the MN-AAA-AE computed according to the MN-AAA-SUB-K, and after receiving the MIP-RRQ message, the FA transmits the MN-AAA-AE to the HA.

In Step 4, the HA notifies the HA-IP adapted to compute the key to the AAA server, requests the validation information, and requests the keys MN-HA-K and FA-HA-K. The AAA server performs the validation by using the MN-AAA-SUB-K, and if the validation is passed, the AAA server computes and distributes the key to the HA.

In Step 5, after obtaining the requested key (the MN-HA-K or the FA-HA-K), the HA processes the MIP registration request, and if the registration is allowed, the HA transmits the MIP-RRP (carrying the MN-HA-AE or the FA-HA-AE) to the FA. The FA requests the MN-FA-K and the FA-HA-K (if necessary) from the anchor authenticator. Then, the FA validates the received MIP-RRP message. After the successful validation, the FA transmits the MIP-RRP message carrying the MN-FA-AE and the MN-HA-AE to the MN.

In Step 6, the MN computes the MN-FA-K and the MN-HA-K, and validates the MIP-RRP message from the FA.

In Steps 7 to 9, the TFA transmits the router broadcast message to the MN. The MN receives the broadcast message to re-initiate the MIP registration request, and performs the MIP registration process similar to Steps 3 to 5.

Embodiment 3

Distribution of a Key Directly Carrying the MN-FA-AE

In the case of ensuring the security of the outermost layer of the network, this embodiment may also provide a satisfactory solution.

1. The Generation and Distribution of a PMIPv4 Key

Figure 7A:
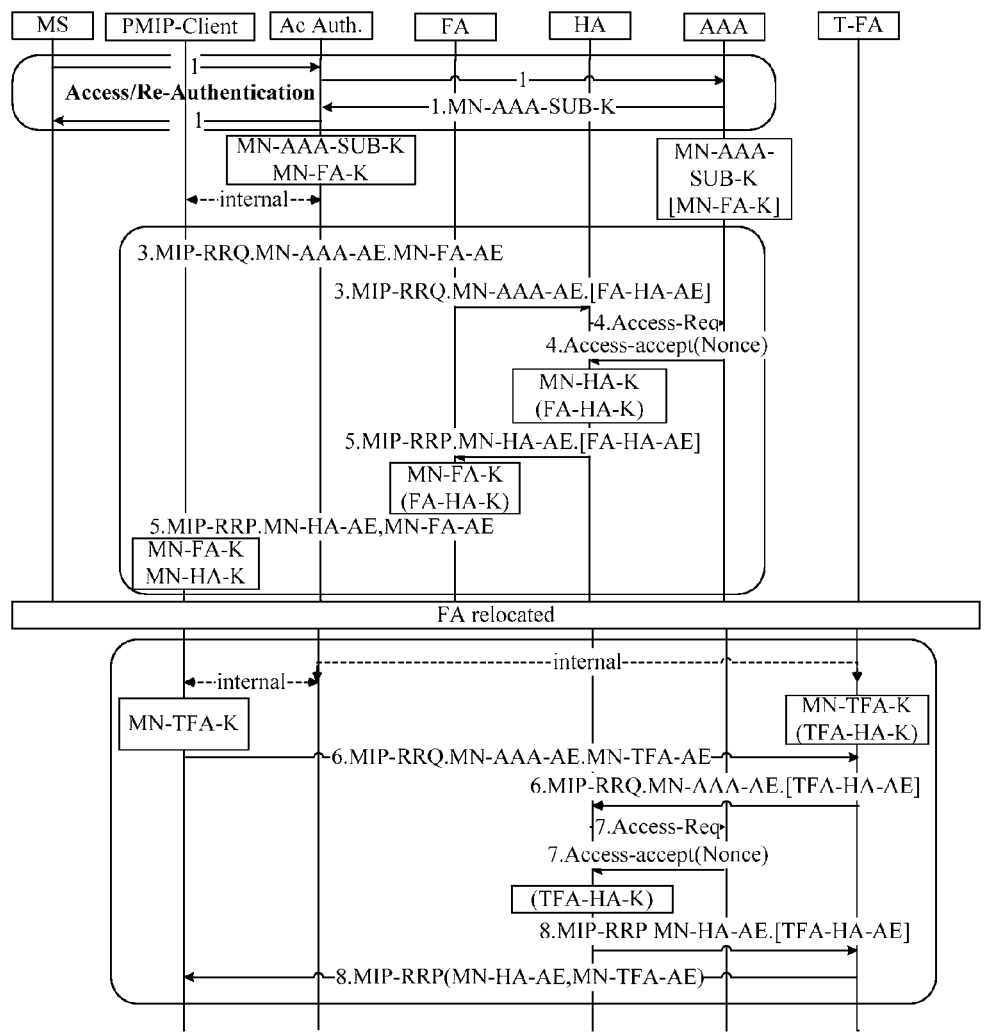
FIG. 7a shows a flow of generating and distributing a modified PMIPv4 key according to a third embodiment of the present invention.

FIG. 7a shows a flow of generating and distributing the PMIPv4 key according to this embodiment, and the flow includes the following steps.

In Step 1, during the course of access validation or re-authorization and re-authentication, the AAA server computes the MN-AAA-SUB-K according to the MN-AAA-K (or the pre-configure key), and distributes the key information of the MN-AAA-SUB-K and the root key to an anchor authenticator.

The root key may be the MN-AAA-SUB-K or other root keys like MSK, EMSK, or MIP-RK. When the root key is the MN-AAA-SUB-K, the MN-AAA-SUB-K is adapted to generate the MN-AAA-AE and compute the MIP key. When the root key of the MIP key is any other root key, the MN-AAA-SUB-K is exclusively adapted to generate the MN-AAA-AE, and the other root key (for example, the MIP-RK) computes the MIP key.

The anchor authenticator and the AAA server both compute the MN-FA-K (the parameter required by the AAA server is notified to the AAA server by the anchor authenticator during the authentication and authentication course (for example, through an access-request message)) by using the same algorithm. In addition, after computing MN-FA-K, the AAA server directly distributes the MN-FA-K to the anchor authenticator.

In Step 2, the PMIP-client and the anchor authenticator share the MN-AAA-SUB-K information through internal interaction.

The PMIP-client and the anchor authenticator are located in one physical entity, so as to share the key information.

In Step 3, after obtaining the MN-AAA-SUB-K, the PMIP-client computes the MN-AAA-AE and triggers the MIP registration process according to the definition of the RFC3957. Preferably, the MIP registration process is an initial MIP registration process.

The whole MIP registration process (Steps 3 to 5 in FIG. 7a) after the MIP registration is triggered may be performed according to the RFC3957 (here only the random number between the MN and the HA is requested, and the random number between the MN and the FA is not requested). Meanwhile, the registration request carries the MN-FA-AE. It is different from the RFC3957 that the FA does not directly interact with the AAA server. In the registration process specified by the existing RFC3957, after receiving the MIP registration request, the FA directly requests the key from the AAA server, and then the AAA computes and distributes the key and the random number to the FA and the HA. However, in the existing WiMAX network, the FA does not directly send the request from the AAA server, so that the FA directly forwards the MIP registration request to the HA, and the HA exchanges the key and the random number with the AAA server (referring to Step 4). In this embodiment, when the FA directly interacts with the AAA server, the whole process can be performed according to the RFC3957.

The FA and the anchor authenticator are located in one physical entity, so as to share the MIP key information obtained by the anchor authenticator through internal interaction.

In Step 4, on receiving the MIP registration request, the HA determines whether to request the key from the AAA server or not according to the fact whether the AE between the MN and the AAA (MN-AAA-AE) is carried or not. If the MIP registration request carries the MN-AAA-AE, the HA requests an HA related MIP key (the MN-HA-K or FA-HA-K) and a random number required by the generation of the MIP key (the random number between the MN and the HA) from an HAAA server. If the HA is located in a visitor network, the request message is forwarded by a VAAA. The AAA server performs the validation by using the MN-AAA-SUB-K, and after the successful validation, the AAA server distributes the MN-HA-K, the FA-HA-K (if necessary), and the random number to the HA.

In Step 5, the HA processes the MIP registration request. If the registration is successful, the HA returns an MIP registration report (MIP-RRP) to the FA, and the message carries the AE (the MN-HA-AE or FA-HA-AE) and the random number.

According to the MIP root key information distributed by the AAA server and the random number distributed during the MIP registration process, the anchor authenticator computes the MIP key between the FA and the MN (MN-FA-K) and the MIP key between the FA and the HA (FA-HA-K). If the FA-HA-K is not obtained in Step 3, the FA obtains the FA-HA-K from the anchor authenticator through internal interaction, and validates the MIP-RRP. After the successful validation, the FA transmits the MIP-RRP carrying the AE (the MN-FA-AE and the MN-HA-AE) to the PMIP-client.

Similarly, the PMIP-client obtains the MN-HA-K and the MN-FA-K from the anchor authenticator through internal interaction, and validates the MIP-RRP from the FA.

In Step 6, if the FA migrates, the PMIP-client is triggered by the entity with the R3 migration, and the anchor authenticator or the PMP-Client refreshes the MN-FA-K once. A optional manner of refreshing the MN-FA-K is provided as follows.

A new MN-TFA-K is computed by using the key shared between the MN and the original FA and the information shared between the MN and the TFA (for example, the TFA-IP).

Alternatively, a new MN-TFA-K is computed by re-substituting the shared key (the MN-FA-K between the MN and the original FA) in the computing formula as the root key. Definitely, the key refreshing manner is not limited herein.

During the R3 migration, the root key information of the MIP key is transferred by a service ASN-GW to a target ASN-GW (if the root key is not transferred, the target ASN-GW needs to request the computation of the sub-key from the service ASN-GW through an access network internal primitive). Through the MIP registration process similar to Steps 3 to 5, the TFA may also build a security association with the MN. However, different from the MIP registration process of Steps 3 to 5, in this process, the MN-HA-K is not changed, and the MIP registration request does not request the random number of the MN-HA.

In addition, when the FA migrates, the MIP registration process of Steps 3 to 5 may be re-executed by means of the access validation and the re-authorization and re-authentication (here, it is necessary to re-request the random number between the MN and the HA).

If the TFA of the R3 migration of Step 6 does not have the shared key with the HA, the anchor authenticator and the AAA server are also required to refresh the FA-HA-K at the same time. Moreover, the TFA requests the original root key or the FA-HA-K from the service FA and refreshes the key into the TFA-HA-K, or directly requests the TFA-HA-K. A refreshing manner is provided as follows.

A new MN-TFA-K is computed by using the key shared between the HA/AAA and the original FA and the information shared between the HA/AAA and the TFA (for example, the FA-IP).

Alternatively, a new TFA-HA-K is computed by re-substituting the shared key in the computing formula as the root key. Definitely, the key refreshing manner is not limited herein.

In this embodiment, the algorithm for refreshing the key is not limited, as long as the algorithms of the two parts involved in the refreshing are consistent.

On receiving the MIP registration request carrying the MN-AAA-AE, the HA requests the TFA-HA-K from the AAA server. On receiving the request of the HA, the AAA server computes the TFA-HA-K according to the refreshing algorithm, and then distributes the TFA-HA-K to the HA. The subsequently accessed MN may register on the MIP by using the built TFA-HA-K.

2. The Generation and Distribution of the CMIPv4 Key.

Figure 7B:
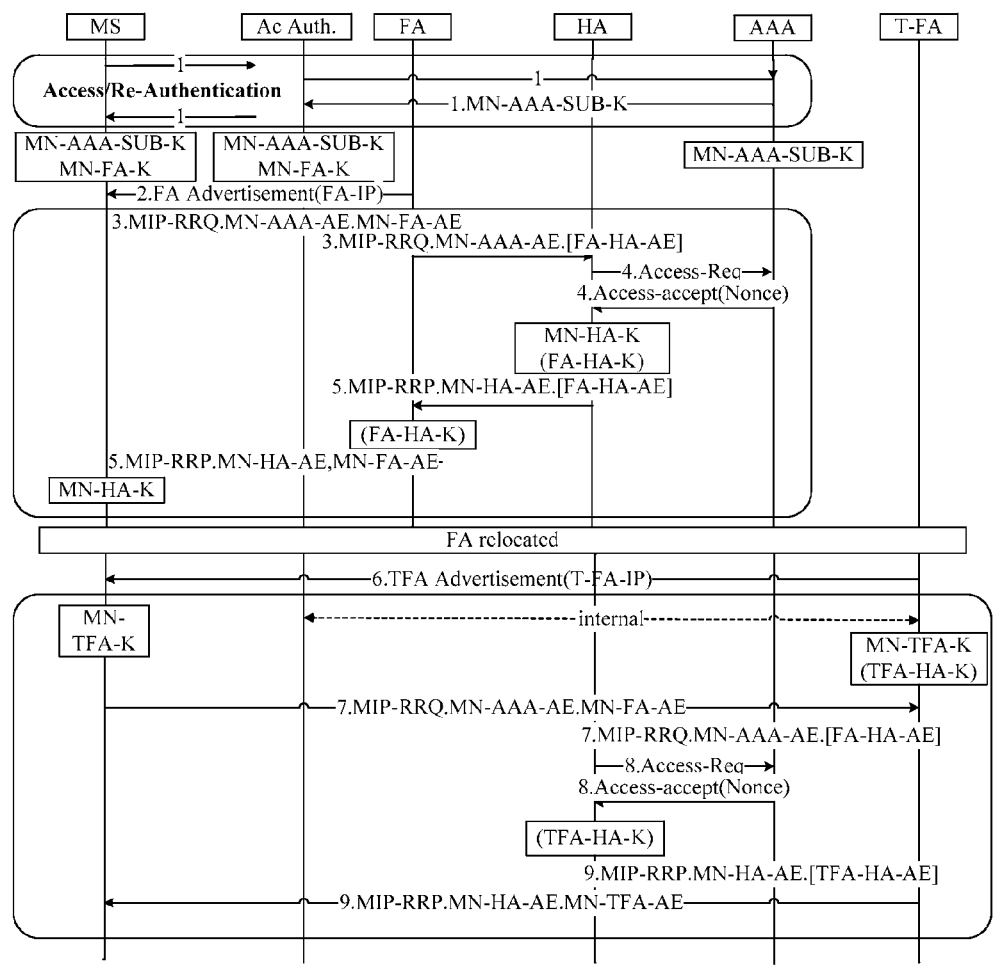
FIG. 7b shows a flow of generating and distributing a modified CMIPv4 key according to the third embodiment of the present invention.

FIG. 7*b* shows a flow of generating and distributing the CMIPv4 key according to this embodiment, and the flow includes the following steps.

In Step 1, during the course of access validation or re-authorization and re-authentication, the MN and the AAA server compute the MN-AAA-SUB-K according to the MN-AAA-K (or the pre-configured key).

The MN and the AAA server also compute the MN-FA-K (the parameter required by the AAA is notified to the AAA server by the anchor authenticator during the authentication course), then the AAA server distributes the MN-FA-K to the anchor authenticator, and the MN and the AAA server adopt the same algorithm to compute the MN-FA-K. Alternatively, the MN and the anchor authenticator compute the MN-FA-K by the same algorithm. In addition, the MN-FA-K may be computed during the subsequent Step 2.

The AAA server distributes the root key including the MIP key to the anchor authenticator. The root key may be the MN-AAA-SUB-K or other root keys like MSK, EMSK, or MIP-RK, so as to compute the MIP key.

In Step 2, the FA transmits an agent broadcast to the mobile node MS. If the MN does not obtain the MN-FA-K of Step 1, the MN-FA-K is computed.

In Step 3, on receiving the agent broadcast transmitted by the FA, the mobile node MS computes the MN-AAA-AE by using the MN-AAA-SUB-K and triggers the MIP registration process according to the definition of the RFC3957 (here only the random number between the MN and the HA is requested, and the random number between the MN and the FA is not requested). Meanwhile, the MIP registration message also carries the MN-FA-AE.

The whole MIP registration process after the MIP registration is triggered may be performed according to the RFC3344 and the RFC3957. Different from the RFC3957, the FA does not directly interact with the AAA but directly forwards the MIP registration request to the HA after validating the MN-FA-AE, so that the HA exchanges the key and the random number with the AAA server. The FA may also be added to the interaction process, and when the FA directly interacts with the AAA server, the whole process can be performed according to the RFC3957, but the random number between the MN and the FA is not requested.

The FA and the anchor authenticator are located in one physical entity, so as to share the key information with the anchor authenticator through internal interaction.

In Step 4, after the HA receives the MIP registration request, if the MIP registration request carries the MN-AAA-AE, the HA requests the validation and an HA related MIP key (the MN-HA-K or the FA-HA-K) and the random number (the random number between the MN and the HA) from an HAAA server. After the successful validation, the HAAA distributes the MN-HA-K, the FA-HA-K (if necessary), and the random number to the HA.

In Step 5, the HA processes the MIP registration request. If the registration is successful, the HA returns an MIP registration report (MIP-RRP) to the FA, and the message carries the AE (the MN-HA-AE or the FA-HA-AE) and the random number.

According to the MIP root key information distributed by the AAA server and the random number distributed during the MIP registration process, the anchor authenticator computes the MIP key between the FA and the HA (FA-HA-K). The FA obtains the FA-HA-K from the anchor authenticator through internal interaction, and validates the MIP-RRP. After the successful validation, the MIP-RRP carrying the AE is transmitted to the mobile terminal MS (i.e., the CMIP-client).

Similarly, the mobile terminal MS (i.e., the CMIP-client) computes the MN-HA-K according to the obtained random number and the root key, and validates the MIP-RRP from the FA.

In Step 6, if the FA migrates, after receiving the agent broadcast message from the TFA, the MS refreshes the MN-FA-K once. An optional manner of refreshing the MN-FA-K is provided as follows.

A new MN-TFA-K is computed by using the key shared between the MN and the original FA and the information shared between the MN and the TFA (for example, the TFA-IP).

Alternatively, a new MN-TFA-K is computed by re-substituting the shared key in the computing formula as the root key. Definitely, the key refreshing manner is not limited herein.

During the R3 migration, the root key information of the MIP key and other information required by the R3 migration are transferred by a service ASN-GW to a target ASN-GW (if the root key is not transferred, the target ASN-GW needs to request the computation of the sub-key from the service ASN-GW through an access network internal primitive). Through the MIP registration process similar to Steps 3 to 5, the TFA may also build a security association with the MN. However, different from the MIP registration process of Steps 3 to 5, in this process, the MN-HA-K is not changed, and the MIP registration request does not request the random number of the MN-HA.

In addition, when the FA migrates, the MIP registration process of Steps 3 to 5 may be re-executed by means of the access validation and the re-authorization and re-authentication (here, it is necessary to re-request the random number between the MN and the HA).

If the TFA of the R3 migration of Step 6 does not have the shared key with the HA, the anchor authenticator and the AAA server are also required to refresh the FA-HA-K at the same time. An optional refreshing manner is provided as follows.

A new MN-TFA-K is computed by using the key shared between the HA/AAA and the original FA and the information shared between the HA/AAA and the TFA (for example, the FA-IP).

Alternatively, a new TFA-HA-K is computed by re-substituting the shared key in the computing formula as the root key. Definitely, the key refreshing manner is not limited herein.

On receiving the MIP registration request carrying the MN-AAA-AE, the HA requests the TFA-HA-K from the AAA server, and then the TFA-HA-K is distributed to the HA. The subsequently accessed MN also may register on the MIP by using the built TFA-HA-K here.

In the above embodiments, the key between the FA and the HA is computed by the anchor authenticator according to the root key distributed by the AAA server during the course of access validation or re-authorization and re-authentication, or is directly distributed to the anchor authenticator by the AAA server.

If the FA and the HA already have the shared key, the MIP registration requests of all the MNs carry the FA-HA-AE. The FA obtains the FA-HA-K through internal interaction with the anchor authenticator.

In the MIP registration request of the above embodiment, when the FA and the HA do not have the shared key, the MIP registration request of the first MN does not carry the FA-HA-AE, but the shared key is built during the process, and then an MIP report carries the FA-HA-AE.

(1) If the FA-HA-K is unrelated to the currently registered MN, i.e., the computing formula does not have the currently registered MN related key, for example, the MSK/EMSK, the MIP registration process of the first MN between each pair of the FA and the HA may build a shared key (related or unrelated to the first MN, but unrelated to the subsequent MNs) and a security association for the FA-HA, and the subsequent MIP registration may directly utilize the shared key and security association, that is, it is not necessary to distribute similar key information during the subsequent MN access validation course. In this manner, the MIP registration request message between the FA and the HA may achieve the purpose of integrity protection by using the FA-HA-K (the FA-HA-AE is not shown).

(2) IF the FA-HA-K is related to the currently registered MN, the first MIP registration request message of each MN cannot carry the FA-HA-AE, but the registration report can carry the FA-HA-AE. Subsequently, all the MIP registrations of the MN may carry the FA-HA-AE, and the MIP registration between the FA and the HA may achieve the purpose of integrity protection by using the FA-HA-K.

In addition, in the embodiment of the present invention, the MIP key between the FA and the HA may be pre-configured. If the FA-HA is pre-configured, similar to the situation with the established FA-HA shared key and security association in (1), the FA-HA-AE is carried. Thus, similarly the MIP registration request message between the FA and the HA may achieve the purpose of integrity protection by using the FA-HA-K.

Embodiment 4

Generation and Distribution of an MIP Key in an MIPv6

The embodiment of the present invention is also applicable to MIPv6. The generation and distribution of the MIP key in the PMIPv6 mode and the CMIPv6 mode are exemplified as follows.

1. The Generation and Distribution of a PMIPv6 Key

Figure 6A:
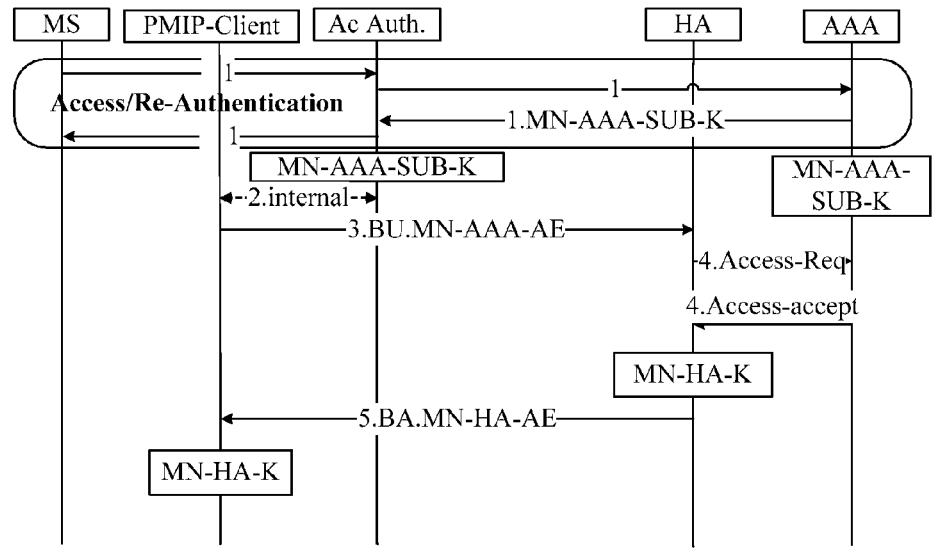
FIG. 6a shows a flow of generating and distributing a PMIPv6 key according to a fourth embodiment of the present invention.

Referring to FIG. 6a, it shows a flow of generating and distributing the PMIPv6 key according to this embodiment, and the flow includes the following steps.

In Step 1, during the course of access validation or re-authorization and re-authentication, the AAA server computes the MN-AAA-SUB-K according to the MN-AAA-K or the pre-configured key, and distributes the key information including the MN-AAA-SUB-K and the root key to an anchor authenticator.

The root key may be the MN-AAA-SUB-K or other root keys like MSK, EMSK, or MIP-RK.

In Step 2, the PMIP-client and the anchor authenticator are located in one physical entity, so as to share the MN-AAA-SUB-K information through internal interaction. If all the parameters adapted to compute the MN-HA-K are obtained, the MN-HA-K can be shared.

In Step 3, the PMIP-client transmits a binding update (BU) carrying the MN-AAA-AE computed according to the MN-AAA-SUB-K.

In Step 4, after receiving the transmitted message of Step 3, the HA requests the AAA server for the validation and the MN-HA-K. Here, the manner of generating the MN-HA-K is not concerned, but should be consistent with the generation manner on the MN (the PMIP-client in this embodiment). After validating the integrity, the AAA server distributes the MN-HA-K if the validation is successful.

In Step 5, the HA processes the BU message. If the binding is successful, the HA transmits a binding acknowledgement (BA) message carrying the MN-HA-AE computed according to the MN-HA-K. If the PMIP-client has already obtained the MN-HA-K in Step 2, the BA message is validated, and the MN-HA-K is requested from the anchor authenticator.

2. The Generation and Distribution of a CMIPv6 Key.

Figure 6B:
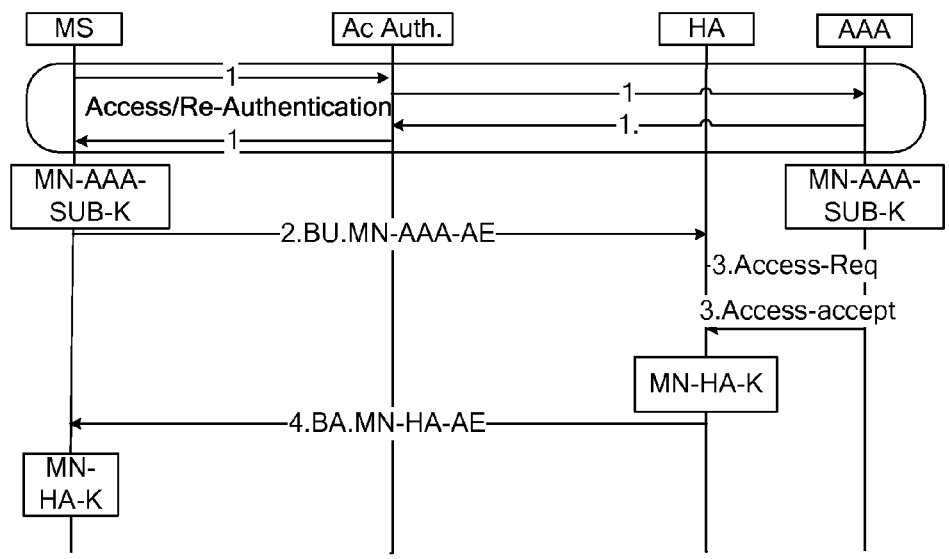
FIG. 6b shows a flow of generating and distributing a CMIPv6 key according to the fourth embodiment of the present invention.

FIG. 6b shows a flow of generating and distributing the CMIPv6 key according to this embodiment, and the flow includes the following steps.

In Step 1, during the course of access validation or re-authorization and re-authentication, the MN and the AAA server compute the MN-AAA-SUB-K according to the MN-AAA-K (or the pre-configured key).

In Step 2, the MN transmits the BU carrying the MN-AAA-AE computed according to the MN-AAA-SUB-K.

In Step 3, after receiving the transmitted message of Step 2, the HA requests the AAA server for the validation and the MN-HA-K. Here, the manner of generating the MN-HA-K is not concerned, but should be consistent with the generation manner on the MN (the CMIP-client in this embodiment). After validating the integrity, the AAA server distributes the MN-HA-K if the validation is successful.

In Step 4, the HA processes the BU message. If the binding is successful, the HA transmits a BA message carrying the MN-HA-AE computed according to the MN-HA-K. If the PMIP-client has already obtained the MN-HA-K, the BA message is validated.

The system for generating and distributing an MIP key in the above embodiments includes an equipment adapted to compute the sub-key between the MN and the AAA server during the course of access validation or re-authorization and re-authentication (for example, in the PMIP mode, the equipment adapted to compute the sub-key between the MN and the AAA server is the AAA server, and in the CMIP mode, the equipment adapted to compute the sub-key between the MN and the AAA server is the AAA server and the mobile terminal); an equipment adapted to compute the AE between the MN and the AAA server according to the sub-key (for example, in the PMIP mode, the equipment adapted to compute the AE between the MN and the AAA server according to the sub-key is the anchor authenticator, and in the CMIP mode, the equipment adapted to compute the AE between the MN and the AAA server according to the sub-key is the mobile terminal); an MN adapted to initiate the MIP registration request or the BU request, which carries the AE between the MN and the AAA server generated according to the sub-key; an HA adapted to request the key from the AAA server according to the AE in the registration request or the BU request; and an FA adapted to forward the MIP registration request.

To sum up, seen from the above embodiments of the embodiment of the present invention, the PMIP-client computes the AE between the MN and the AAA server (MN-AAA-AE) without the need of distributing the key between the MN and the AAA server (MN-AAA-K). The PMIP and the CMIP in the NWG are unified to notify the HA during the re-validation (including the MIPv6) and FA migration (not including the MIPv6). The MIP registration process of the NWG is realized by reasonably utilizing the existing RFC course in the above embodiments. The key is computed according to the random number, so as to reduce the computing complexity by using the IP address as a parameter for computing the MIP key.

Embodiment 5

Further, in order to solve the problems in the prior art, the embodiment of the present invention provides an alternative key distributing solution. In the alternative solution, if the MN-HA-K adopts the HA-IP as an input parameter, when not knowing the HA address, the MS initiates the MIP registration request carrying the MN-HA-AE, but here the MN-HA-K can only be computed by using all 0/1 or other specific values. However, subsequently it is necessary to adopt the MN-HA-K computed by using the practical HA unicast IP address, and based on this, the basic concept of the alternative solution is described as follows.

In case that the MN does not know the HA, the MN-HA-K1 is computed by adopting all 0/1 as the HA-IP, and then the MN-HA-AE1 is computed according to the MN-HA-K1.

In order to validate the MN-HA-AE1, the HA must have the MN-HA-K1.

However, in order to show the real unicast HA-IP, the MIP-RRP transmitted by the HA carries the MN-HA-AE2, and the MN-HA-AE2 must be computed according to the MN-HA-K2.

In order to compute the MN-HA-AE2, the HA must have the MN-HA-K2.

Therefore, when the HA sends the request to the AAA server after receiving the MIP-RRQ, the AAA server must distribute two MN-HA-Ks.

Figure 8:
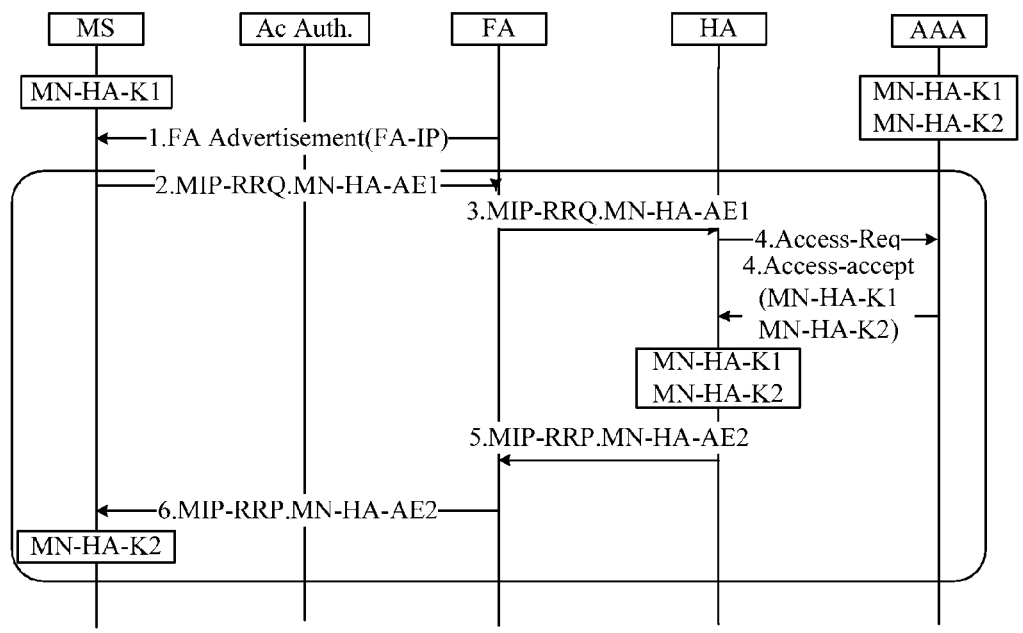
FIG. 8 shows a flow of generating and distributing the CMIPv4 key according to a fifth embodiment of the present invention.

The MN-HA key distribution in the CMIP mode includes the following steps (as shown in FIG. 8).

In Step 1, the MS receives an FA broadcast.

In Step 2, the MS initiates an MIP registration request. The MS does not know the HA address, the MN-HA-K1 is computed by using all 0/1, and then the MN-HA-AE1 is computed and carried in the registration request. Optionally, the MIP registration request may further carry indication information indicating to validate the carried AE by using the MN-HA-K1.

In Step 3, after receiving the MIP registration request carrying the MN-HA-AE1, the HA requests the AAA server for the key. The HA should request two keys, one is the MN-HA-K1 computed by using all 0/1 and other specific values, and the other is the MN-HA-K2 computed by using the subsequently adopted unicast HA address.

In Step 4, the AAA distributes the key information requested by the HA.

In Step 5, the HA validates the MN-HA-AE1 in the MIP registration request by using the MN-HA-K1, processes the MIP registration request, and transmits the MIP registration report to the FA. The MIP registration report carries the MN-HA-AE2 computed according to the MN-HA-K2.

In Step 6, after receiving the MIP registration report, the MS obtains the practical HA unicast IP address, computes the MN-HA-K2, and validates the MN-HA-AE2 in the MIP registration report by using the MN-HA-K2.

FIG. 8 is only adapted to exemplify the MN-HA key distribution in the CMIP mode according to this embodiment, instead of limiting the embodiment of the present invention. The embodiment of the present invention is also applicable to the PMIP mode.

Figure 9A:
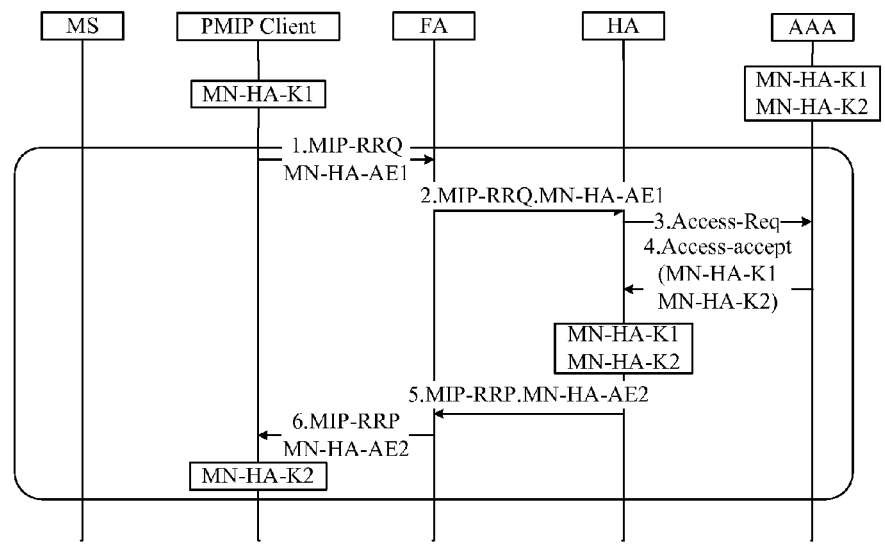
FIG. 9a shows a flow of generating and distributing the PMIPv4 key according to the fifth embodiment of the present invention.
Figure 9B:
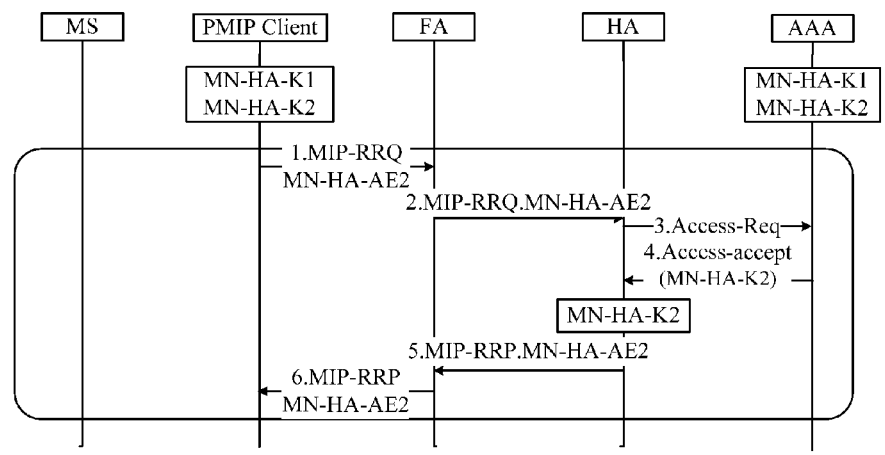
FIG. 9b shows another flow of generating and distributing the PMIPv4 key according to the fifth embodiment of the present invention.

FIGS. 9a and 9b are schematic views of the MN-HA key distribution process in the PMIP mode according to this embodiment. Referring to FIG. 9a, the process includes the following steps.

In Step 1, the MN (PMIP-client) transmits the MIP registration request (carrying the AE MN-HA-AE1 generated according to the MN-HA-K1 computed by using all 0/1) to the FA. The MIP registration request message may further carry indication information indicating to validate the carried AE by using the MN-HA-K1.

In Step 2, the FA receives and transmits the MIP registration request to the HA.

In Step 3, after receiving the MIP registration request carrying the MN-HA-AE1, the HA requests the key from the AAA server (for example, request the key from the AAA server through an access-request message). The HA should request two keys, one is the MN-HA-K1 computed by using all 0/1 and other specific values, and the other is the MN-HA-K2 computed by using the subsequently adopted unicast HA address.

In Step 4, the AAA server returns an access-accept (carrying two keys: one is the MN-HA-K1 computed by using the all 0/1, and the other is the MN-HA-K2 computed by using the real HA address) to the HA.

In Step 5, the HA validates and processes the MIP registration request by using the MN-HA-K1, and transmits the MIP registration report to the FA. The MIP registration report carries the MN-HA-AE2 generated according to the MN-HA-K2 computed by using the real HA address. Here, the HA may delete the MN-HA-K1.

In Step 6, the FA processes and transmits the MIP registration request to the PMIP-client. If the PMIP-client does not obtain the HA address before, after receiving the MIP registration report, the PMIP-client obtains the practical HA unicast IP address, computes the MN-HA-K2, and validates the MN-HA-AE2 in the MIP registration report by using the MN-HA-K2.

In the key distribution process corresponding to FIGS. 8 and 9a, the MN-HA key computed by using 0/1 as the HA address may be adopted in the MIP registration processes during the validity of the authentication.

The system for realizing the key distribution corresponding to FIGS. 8 and 9a includes the mobile node (the MN or PMIP-client), the HA, and the FA.

The MN is adapted to transmit the MIP registration request. The MIP registration request carries the MN-HA-AE1 generated according to the key between the MN and the HA MN-HA-K1 computed by using an IP address replacement value.

The HA is adapted to receive the MIP registration request, request the authentication server for the key MN-HA-K1 and the key MN-HA-K2 between the MN and the HA computed by using the IP address of the HA, and transmit the MIP registration report carrying the AE generated according to the MN-HA-K2 (MN-HA-AE2) to the FA after the successful validation performed on the MN-HA-AE1 in the registration request by using the MN-HA-K1.

The FA is adapted to transmit the registration report carrying the MN-HA-AE2 to the MN.

The MN validates the MN-HA-AE2 by using the computed MN-HA-K2.

The PMIP-client is on the ASN-GW, and the HA address is distributed to the ASN, so that the PMIP-client may obtain the MN-HA-K1 and the MN-HA-K2 at the same time. Here, the MIP registration request of Step 1 may carry the MN-HA-AE2 generated according to the MN-HA-K2 computed by using the real HA address.

Therefore, in the PMIP mode, the distribution process of the MN-HA key may be as follows (as shown in FIG. 9b).

In Step 1, the PMIP-client transmits the MIP registration request (carrying the MN-HA-AE2 generated according to the MN-HA-K2 computed by using the real HA address, and the MN-HA-AE1 generated according to the MN-HA-K1 computed by using all 0/1 to the FA.

Here, in order to make the HA correctly process the MIP registration request from the CMIP and the PMIP terminal, the MIP registration request must clearly point out the key (the MN-HA-K1 or the MN-HA-K2, and being the MN-HA-K2 in this embodiment) adapted to generate the AE.

In Step 2, the FA receives and transmits the MIP registration request to the HA.

In Step 3, after receiving the MIP registration request carrying the MN-HA-AE2, the HA transmits the access-request to request the two keys (the MN-HA-K1 and the MN-HA-K2) between the MN and the HA from the AAA server. Alternatively, it is indicated in the access-request that only the MN-HA-K2 is requested.

In Step 4, the AAA server returns the access-accept (carrying two keys: one is the MN-HA-K1 computed by using the all 0/1, and the other is the MN-HA-K2 computed by using the real HA address) to the HA. If it is indicated in Step 3 that only the MN-HA-K2 is requested, only the MN-HA-K2 is transmitted to the HA.

In Step 5, the HA selects the key to perform the validation according to the indication of the MIP registration request. In this embodiment, the MIP registration request is validated and processed by using the MN-HA-K2, and then the MIP registration report is transmitted to the FA. The MIP registration report carries the AE generated according to the MN-HA-K2 computed by using the real HA address. Here, the HA may delete the MN-HA-K1.

In Step 6, the FA processes and transmits the MIP registration request to the PMIP-client.

In the key distribution process corresponding to FIG. 9b, the MN-HA-K1 is adopted in the first time of transmitting the MIP registration request, and the MN-HA-K2 is adopted in the subsequent MIP registration requests and answers.

The system for realizing the key distribution corresponding to FIG. 9b includes the PMIP-client, the HA, and the FA.

The PMIP-client is adapted to transmit the MIP registration request to the FA. The MIP registration request carries the MN-HA-AE2 generated according to the MN-HA-K2 computed by using the real HA address and the MN-HA-AE1 generated according to the MN-HA-K1 computed by using all 0/1. In order to make the HA correctly process the MIP registration request, the MIP registration request clearly points out the key (the MN-HA-K1 or the MN-HA-K2, and being the MN-HA-K2 in this embodiment) adapted to generate the AE.

The HA is adapted to receive the MIP registration request, and request the two keys (the MN-HA-K1 and the MN-HA-K2) between the MN and the HA from the AAA server, or indicate that only the MN-HA-K2 is requested, and transmit the MIP registration report carrying the AE generated according to the MN-HA-K2 computed by using the real HA address after the successful validation performed on the MN-HA-AE2 in the registration request by using the MN-HA-K2.

The FA is adapted to process and transmit the MIP registration report to the PMIP-client.

When the MN does not know the HA address, the MN-HA-K is computed only by using all 0/1 or other specific values. In case that one MN communicates with two HAs, the two HAs share the same key, which is unreasonable for security. In the above embodiment, the adoption of the key computed by using all 0/1 during the MIP registration process is only a temporary solution when the MN does not know the HA address. The formal formula of computing the key MN-HA-K2 has the HA address, so as to prevent the absurdity on security.

In the alternative key distribution solution of the embodiment of the embodiment of the present invention, the interaction between the HA and the AAA is emphasized, that is, the AAA must be able to distribute two MN-HA-Ks. The flows before the MIP registration request and other flows may be easily achieved through the prior art, so the solution does not emphasize or pay attention to the flows, and thus the description is omitted.

It will be apparent to those skilled in the art that various modifications and variations can be made to the structure of the embodiment of the present invention without departing from the scope or spirit of the invention. In view of the foregoing, it is intended that the embodiment of the present invention cover modifications and variations of this invention provided they fall within the scope of the following claims and their equivalents.

What is claimed is:

1. A method for generating and distributing a mobile IP (MIP) key, comprising:

receiving, by a foreign agent (FA), an MIP registration request from a mobile node (MN), wherein the MIP registration request carries a first authentication extension (AE) between the MN and a home agent (HA), and the first AE is generated according to a first key between the MN and the HA computed by using an IP address replacement value of the HA, wherein all bits of the IP address replacement value of the HA are 0 or all bits of the IP address replacement value of the HA are 1;

transmitting, by the FA, the MIP registration request to the HA;

receiving, by the HA, the MIP registration request from the FA;

obtaining, by the HA, from an authentication server, the first key and a second key between the MN and the HA computed by using an IP address of the HA;

validating, by the HA, the first AE in the registration request by using the first key, and transmitting an MIP registration report to the FA after the successful validation, wherein the registration report carries a second AE generated according to the second key; and transmitting, by the FA, the registration report carrying the second AE to the MN, so that the MN can validate the second AE by using the second key.

2. The method according to claim 1, wherein the MIP registration request carries indication information for validating the first AE by using the first key.

3. A system for generating and distributing a mobile IP (MIP) key, comprising:

a home agent (HA) and a foreign agent (FA), wherein the FA is configured to receive an MIP registration request from a mobile node (MN) and transmit the MIP registration request to the HA, wherein the MIP registration request carries a first authentication extension (AE) between the MN and the HA, and the first AE is generated according to a first key between the MN and the HA computed by using an IP address replacement value of the HA, wherein all bits of the IP address replacement value of the HA are 0 or all bits of the IP address replacement value of the HA are 1;

the HA is configured to receive the MIP registration request from the FA, obtain from an authentication server the first key and a second key between the MN and the HA computed by using an IP address of the HA, validate the first AE in the registration request by using the first key, and transmit an MIP registration report carrying a second AE generated according to the second key to the FA after the successful validation; and the FA is further configured transmit the registration report carrying the second AE to the MN, so that the MN can validate the second AE by using the second key.

4. A method for generating and distributing a mobile IP (MIP) key, comprising:

receiving, by a foreign agent (FA), an MIP registration request from a proxy MIP (PMIP) client, wherein the MIP registration request carries a first authentication extension (AE), the first AE is generated according to a first key between a mobile node (MN) and a home agent (HA) computed by using an IP address replacement value of the HA, wherein all bits of the IP address replacement value of the HA are 0 or all bits of the IP address replacement value of the HA are 1;

transmitting, by the FA, the MIP registration request to the HA;

receiving, by the HA, the MIP registration request transmitted by the FA, and obtaining from an authentication server the first key and a second key between the MN and the HA computed by using an IP address of the HA;

validating, by the HA, the first AE in the registration request by using the first key, and transmitting an MIP registration report to the FA after successful validation, wherein the registration report carries a second AE generated according to the second key; and transmitting, by the FA, the registration report carrying the second AE to the PMIP-client.

5. The method according to claim 4, wherein the MIP registration request carries indication information indicating to validate the carried first AE by using the first key between the MN and the HA computed according to the IP address replacement value of the HA.

6. A system for generating and distributing a mobile IP (MIP) key, comprising:

a home agent (HA) and a foreign agent (FA); wherein the FA is configured to receive an MIP registration request from a proxy MIP (PMIP) client and transmit the MIP registration request to the HA, wherein the MIP registration request carries a first authentication extension (AE), the first AE is generated according to a first key between a mobile node (MN) and the HA computed by using an IP address replacement value of the HA, wherein all bits of the IP address replacement value of the HA are 0 or all bits of the IP address replacement value of the HA are 1;

the HA is configured to receive the MIP registration request from the FA, obtain from an authentication server the first key and a second key between the MN and the HA computed by using an IP address of the HA, validate the first AE in the registration request by using the first key, and transmit an MIP registration report carrying a second AE generated according to the second key to the FA after the successful validation; and the FA is further configured to receive the MIP registration report from the HA, and transmit the registration report carrying the second AE to the PMIP-client.

* * * * *